(12) United States Patent
Ananthanarayanan (10) Patent No.: US 8,563,891 B2
(45) Date of Patent: Oct. 22, 2013

(54) WELDING ASSEMBLY AND METHOD

(71) Applicant: Innovative Weld Solutions Ltd., Dayton, OH (US)

(72) Inventor: Venkatasubramanian Ananthanarayanan, Beavercreek, OH (US)

(73) Assignee: Innovative Weld Solutions Ltd., Dayton, OH (US)

( * ) Notice: Subject to any disclaimer, the term of this patent is extended or adjusted under 35 U.S.C. 154(b) by 0 days.

(21) Appl. No.: 13/739,029

(22) Filed: Jan. 11, 2013

(65) Prior Publication Data

US 2013/0119035 A1    May 16, 2013

Related U.S. Application Data

(63) Continuation of application No. 12/820,596, filed on Jun. 22, 2010, now Pat. No. 8,357,871, which is a continuation-in-part of application No. 12/437,145, filed on May 7, 2009.

(51) Int. Cl.
*B23K 9/24* (2006.01)
*B23K 9/10* (2006.01)

(52) U.S. Cl.
USPC ........ 219/119; 219/108; 219/117.1; 219/110; 219/121.31; 219/124.02; 219/136; 219/144

(58) Field of Classification Search
USPC ............ 219/108, 117.1, 110, 121.31, 124.02, 219/136, 144
See application file for complete search history.

(56) References Cited

U.S. PATENT DOCUMENTS

| | | | | |
|---|---|---|---|---|
| 1,592,605 A * | 7/1926 | Ledwinka | ........................ | 219/94 |
| 5,726,410 A * | 3/1998 | Fukushima et al. | ....... | 219/117.1 |
| 5,961,853 A * | 10/1999 | Thornton | .................... | 219/85.14 |
| 6,222,152 B1 * | 4/2001 | Nomura et al. | ................ | 219/118 |
| 6,646,221 B2 * | 11/2003 | Wang et al. | .................... | 219/118 |
| 6,770,835 B1 * | 8/2004 | Hengel et al. | .................... | 219/93 |
| 7,126,077 B2 * | 10/2006 | Wang | .......................... | 219/117.1 |

* cited by examiner

*Primary Examiner* — Viet Q Nguyen
(74) *Attorney, Agent, or Firm* — Walters & Wasylyna LLC (57) ABSTRACT

A welding assembly including a current generator, an electrode electrically coupled to the current generator, the electrode including a first engagement surface, and a workpiece including at least two members, wherein at least one of the members includes a second engagement surface, defines a recess in the second engagement surface, and is electrically coupled to the current generator.

8 Claims, 10 Drawing Sheets

FIG. 13

WELDING ASSEMBLY AND METHOD

PRIORITY

This application is a continuation of U.S. Ser. No. 12/820, 596 filed on Jun. 22, 2010, now U.S. Pat. No. 8,357,871 which is a continuation-in-part of U.S. Ser. No. 12/437,145 filed on May 7, 2009. The entire contents of both U.S. Ser. Nos. 12/437,145 and 12/820,596 are incorporated herein by reference.

FIELD

The present patent application relates to welding apparatus, systems and methods and, more particularly, to resistance welding assemblies for welding and heat treating metals and metal alloys.

BACKGROUND

Aluminum alloys find a wide variety of applications due to their favorable combination of mechanical properties, including strength-to-weight ratio, low temperature (cryogenic) properties, corrosion resistance and notch toughness. The challenge with aluminum alloys is to maintain these mechanical properties and corrosion resistance at weld joints and weld heat-affected-zones.

Heat-treated aluminum alloys tend to substantially soften during most known welding processes, resulting in weaknesses at and around the weld joint. Furthermore, some welding processes, such as resistance spot welding ("RSW"), significantly reduce thickness in the workpiece at the weld joint, which further erodes the strength and other mechanical properties at and around the weld joint.

In addition to the obstacles presented by degradation of mechanical properties resulting from conventional welding processes, certain high strength aluminum alloys are not easily weldable. Specifically, high strength aluminum alloys tend to present cracks during solidification after the welding heat has been terminated. Unfortunately, it is typically the high strength aluminum alloys that are not easily weldable.

Relatively new weld processes, such as friction stir welding, have improved the mechanical properties of aluminum alloys at and around weld joints. However, the equipment and tooling associated with friction stir welding are very expensive and difficult to maintain. Furthermore, friction stir welding often results in cross-section reductions at the weld joints, which are left behind by tooling being withdrawn from the welded part. Therefore, even new welding processes, such as friction stir welding, result in some loss of mechanical properties (e.g., strength) at and around weld joints.

Accordingly, those skilled in the art continue to seek new welding techniques, including welding techniques that do not degrade the mechanical properties or corrosion resistance of the workpiece at and around the weld joint.

SUMMARY

In one aspect, the disclosed welding assembly may include a current generator, a first electrode electrically coupled to the current generator, the first electrode including a first engagement surface and a protrusion extending from the first engagement surface, and a second electrode electrically coupled to the current generator, the second electrode including a second engagement surface and defining a recess in the second engagement surface, wherein the protrusion is configured to urge a weld joint, which may be a weld nugget or a solid-state joint, into the recess during a welding operation.

In another aspect, the disclosed welding assembly may include a current generator including a first terminal and a second terminal, the second terminal having a polarity opposite of a polarity of the first terminal, a first electrode electrically coupled to the first terminal, the first electrode including a first engagement surface, and a second electrode electrically coupled to the second terminal, the second electrode including a second engagement surface and a recess in the second engagement surface, wherein at least one of the first and second electrodes is rotatable about an axis of rotation.

In another aspect, the disclosed welding assembly may include a current generator, an electrode electrically coupled to the current generator, the electrode including a first engagement surface, and a workpiece including at least two members, wherein at least one of the members includes a second engagement surface, defines a recess in the second engagement surface, and is electrically coupled to the current generator.

In another aspect, a welded workpiece may be formed using the disclosed welding assembly. In one particular aspect, the welded workpiece may include a first member connected to a second member at a weld joint, the weld joint being displaced from the first and second members, wherein the first and second members have a combined first cross-sectional thickness and the weld joint has a second cross-sectional thickness, the second cross-sectional thickness being greater than or equal to the first cross-sectional thickness.

In another aspect, the disclosed method for welding a workpiece may be performed using a welding assembly that includes a first electrode, a second electrode and a current generator. The method may include the steps of positioning the workpiece between the first and second electrodes, passing a first electric current through the workpiece to raise a temperature of the workpiece to a welding temperature to form a weld joint, which may be a weld nugget or a solid-state weld, passing a second electric current through the weld joint to maintain a temperature of the weld joint at a solutionizing temperature to form a partially heat-treated weld joint, and passing a third electric current through the partially heat-treated weld joint to maintain a temperature of the partially heat-treated weld joint at a precipitating temperature to form a final heat-treated weld joint.

In another aspect, the disclosed method for welding a workpiece may be performed using a welding assembly. The welding assembly may include a first electrode, a second electrode and a current generator. The method may include the steps of positioning a target zone of the workpiece between the first and second electrodes, passing an electric current through the target zone to raise a temperature of the target zone to the welding temperature for a first predetermined amount of time to form a weld joint, cooling the weld joint, after the cooling step, passing an electric current through the weld joint to raise a temperature of the weld joint to a solutionizing temperature for a second predetermined amount of time to form a partially heat-treated weld joint, cooling the partially heat-treated weld joint, after the second cooling step, passing an electric current through the partially heat-treated weld joint to raise a temperature of the partially heat-treated weld joint to a precipitating temperature for a third predetermined amount of time to form a final heat-treated weld joint, and cooling the final heat-treated weld joint. The current during the welding, solutionizing or precipitating steps may be applied continuously or in pulses with cool times in between pulses within each step.

In another aspect, the disclosed method for forming a weld joint may include the steps of (1) providing a current generator including a first terminal and a second terminal, the second terminal having a polarity opposite of a polarity of the first terminal, (2) assembling a workpiece including a first member and a second member, the first member being electrically coupled to the first terminal and including a first engagement surface and a recess in the first engagement surface, (3) positioning an electrode proximate the second member, the electrode being electrically coupled to the second terminal, and (4) passing a welding current through the workpiece to form the weld joint.

In yet another aspect, the disclosed method for welding a first member to a second member may include the steps of (1) forming a recess in the first member, (2) assembling a workpiece including the first member, the second member and an auxiliary member and (3) passing an electric, current through the workpiece to form a weld joint in the recess.

Other aspects of the disclosed welding assembly and associated methods for welding and heat treating metals and metal alloys will become apparent from the following description, the accompanying drawings and the appended claims.

DETAILED DESCRIPTION

Figure 1:
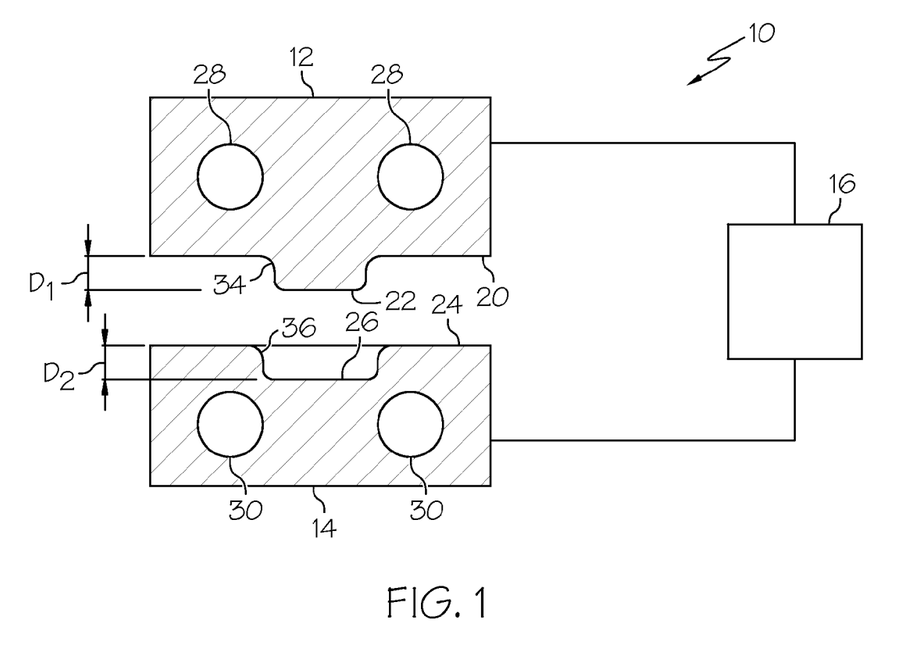
FIG. 1 is a schematic illustration of one aspect of the disclosed welding assembly, wherein the welding assembly includes first and second electrodes, which are shown in cross-section.

As shown in FIG. 1, one aspect of the disclosed welding assembly, generally designated 10, may include a first electrode 12, a second electrode 14 and a current generator 16. The first and second electrodes 12, 14 may be mounted on a support structure (not shown), such as a pair of moveable arms or one stationary and one moveable arm, capable of approximating the first and second electrodes 12, 14 to clamp a workpiece 18 (FIG. 3A) therebetween.

The first electrode 12 may be electrically coupled to the current generator 16 and may include an engagement surface 20 having a protrusion 22 extending a distance $D_1$ therefrom. While, in one aspect, the protrusion 22 may be integral with the first electrode 12, those skilled in the art will appreciate that the protrusion 22 may be formed as a separate piece that has been securely connected to the first electrode 12.

Figure 2:
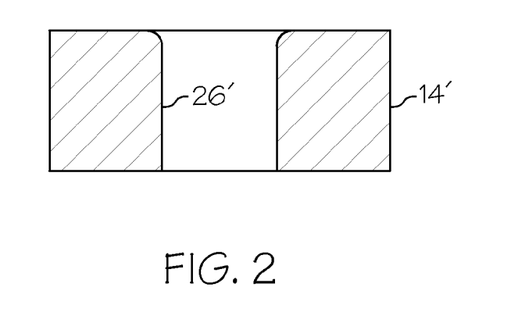
FIG. 2 is a cross-sectional view of an alternative aspect of the second electrode shown in FIG. 1.

The second electrode 14 may be electrically coupled to the current generator 16 and may include an engagement surface 24 that defines a recess 26 therein. In one aspect, the recess 26 may extend a distance $D_2$ into the engagement surface 24 of the second electrode 14 to provide the recess 26 with the desired volume. While distance $D_1$ may be substantially equal to distance $D_2$, those skilled in the art will appreciate that distances $D_1$ and $D_2$ may be different. For example, in one particular aspect, distance $D_2$ may be greater than distance D. Referring to FIG. 2, in an alternative aspect, the recess 26' may extend entirely through the second electrode 14'.

The first and second electrodes 12, 14 may include fluid channels 28, 30 defined therein or connected thereto. A cooling fluid, such as water or ethylene glycol, may flow through the fluid channels 28, 30 to remove heat from the first and second electrodes 12, 14, as well as from the workpiece 18 (FIG. 3A) supported by the first and second electrodes 12, 14.

The first and second electrodes 12, 14 may be formed from an electrically conductive material. Furthermore, the first and second electrodes 12, 14 may be formed from a material having a thermal conductivity (either relative high thermal conductivity or relatively low thermal conductivity) selected based upon the type of weld joint desired (nugget versus solid-state) or method step (discussed below) being performed by the first and second electrodes 12, 14. For example, the first and second electrodes 12, 14 may be formed from copper or copper alloys (e.g., Resistance Welder Manufacturers Association ("RWMA") copper alloys Classes 1-5 or 20) when relatively high thermal conductivity is desired (e.g., when performing the step shown in block 54 in FIG. 6). Alternatively, the first and second electrodes 12, 14 may be formed from refractory materials, tungsten/copper alloys or molybdenum (e.g., RWMA Classes 10-14) when relatively low thermal conductivity is desired (e.g., when performing the steps shown in blocks 56 and 58 in FIG. 6). In general, a more conducting electrode material may be used when a steeper thermal gradient is desired between the electrodes for the method step or the joint type desired and a less conducting electrode material may be used when a less steep temperature gradient is desired between the electrodes.

Figure 3A:
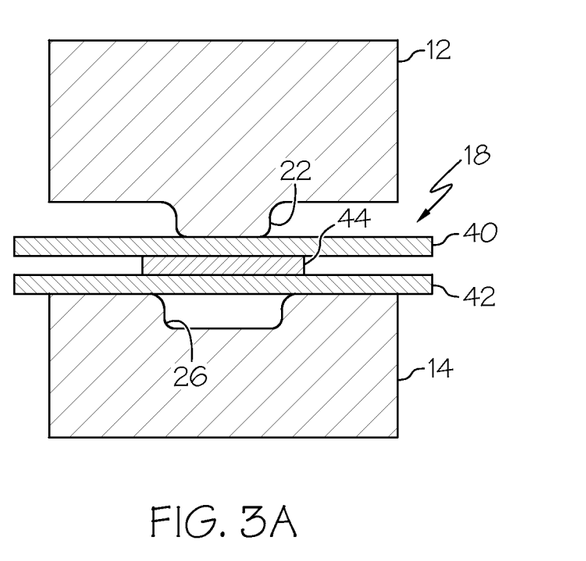
FIGS. 3A, 3B and 3C are cross-sectional views of a workpiece being welded and heat treated by the welding assembly of FIG. 1 in accordance with a first aspect of the present disclosure.
Figure 3B:
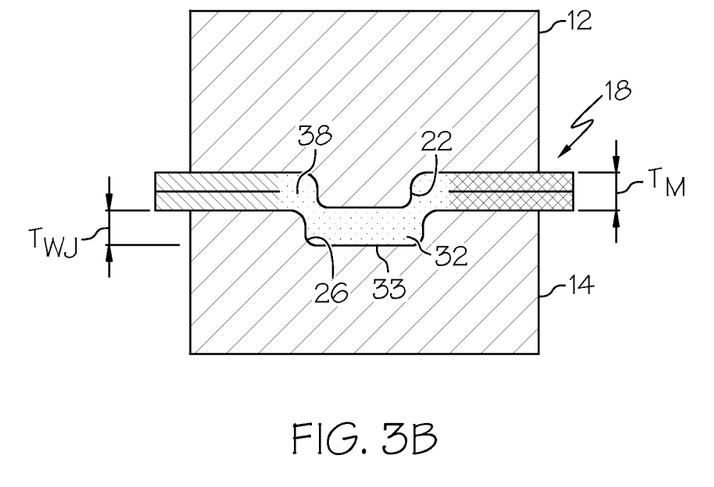

Referring to FIGS. 3A and 3B, the protrusion 22 of the first electrode 12 may be generally complimentary in size and shape with the recess 26 in the second electrode 14 to urge a portion of the workpiece 18 into the recess 26 during welding. A weld joint 32 may be formed as the workpiece 18 is resistively heated and urged into the recess 26 by the protrusion 22. The weld joint 32 may be displaced from the adjacent portion of the workpiece 18 and may have a size and shape dictated by the size and shape of the protrusion 22 and corresponding recess 26. The amount of displacement of the weld joint 32 may be dictated by the distance $D_1$ the protrusion 22 extends from the engagement surface 20 and/or the distance $D_2$ that the recess 26 extends into the engagement surface 24. In one particular aspect, when the workpiece 18 defines a plane, which may be flat or curved, the weld joint 32 may be displaced from the plane of the workpiece 18.

Figure 3C:
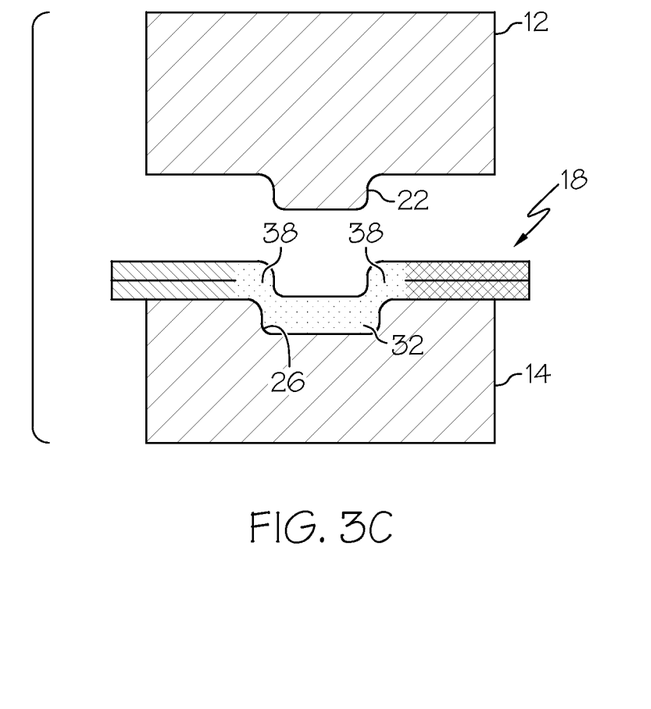

Referring back to FIG. 1, the engagement surface 20 of the first electrode 12 and the protrusion 22 may define a filleted corner 34, while the engagement surface 24 of the second electrode 14 and the recess 26 may define a rounded edge 36. The filleted corner 34 and the rounded edge 36 may be complimentary and may provide a curved transition region 38 between the weld joint 32 and the adjacent workpiece 18, as shown in FIGS. 3B and 3C.

Those skilled in the art will appreciate that the protrusion 22 and the recess 26 may be provided in various sizes, shapes and configurations. In one aspect, the protrusion 22 and recess 26 may be configured to form a spot weld. For example, the protrusion 22 may be a generally cylindrical protrusion and the recess 26 may be a corresponding, generally cylindrical recess, thereby resulting in a generally circular spot weld. Those skilled in the art will appreciate that welds having various shapes (e.g., elliptical and rectangular) may be formed.

In another aspect, the protrusion 22 and recess 26 may be configured to form an elongated weld. As one example, the protrusion 22 may be an elongated, ridge-like protrusion and the recess 26 may be a corresponding, elongated, trough-like recess, thereby resulting in a generally elongated (e.g., linear) weld. As another example, the first electrode 12 and/or the second electrode 14 may rotate about an axis of rotation relative to the other electrode to define a nip between the electrodes 12, 14.

Figure 13:
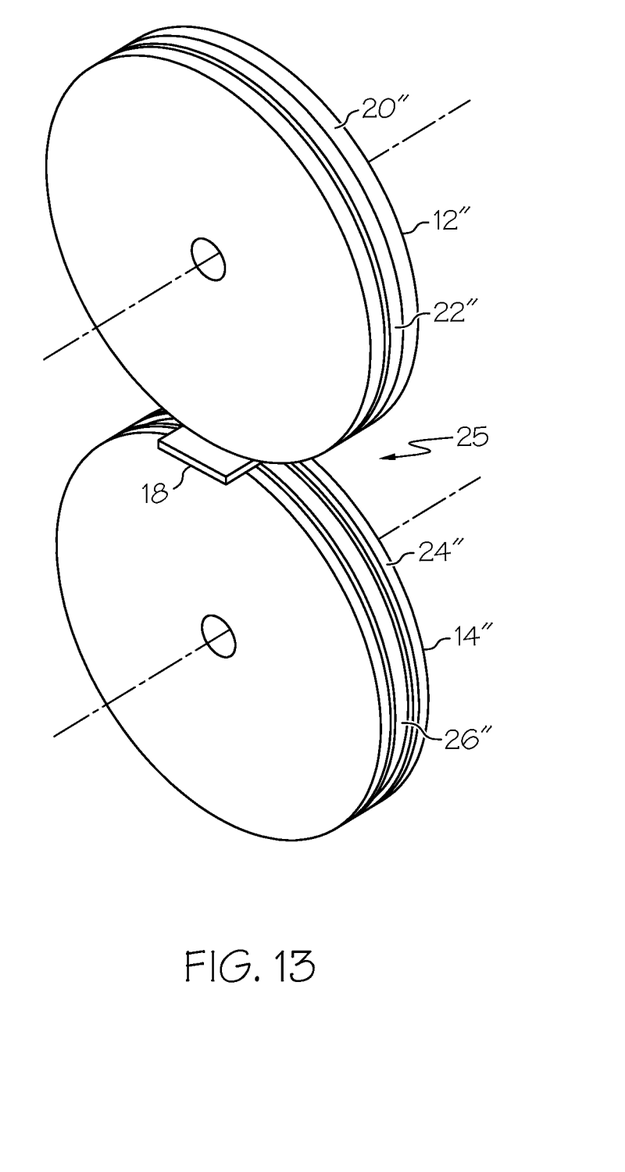
FIG. 13 is a schematic perspective view of yet another aspect of the disclosed welding assembly.

Referring to FIG. 13, as a specific example, the first 12" and second 14" electrodes may be rotating cylindrical drums and the engagement surfaces 20", 24" of the electrodes 12", 14" may be the outer surfaces of the drums. The first rotating electrode 12" may include a protrusion 22" and the second rotating electrode 14" may include a recess 26". The workpiece 18 may pass through the nip 25 defined by the rotating electrodes 12", 14" such that a continuous, elongated weld joint may be formed.

In yet another aspect, the protrusion 22 and recess 26 may be configured to form circumferential or partially circumferential weld. For example, the protrusion 22 may be a circumferentially radiating protrusion and the recess 26 may be a corresponding circumferential, trough-like recess, thereby resulting in a generally circumferential weld when the first electrode 12 is positioned exterior to a tube-like workpiece (not shown) and the second electrode 14 is positioned interior of the tube-like workpiece.

The current generator 16 may be any source of electrical energy capable of supplying an electric current to the first and second electrodes 12, 14 to achieve resistive heating in the workpiece 18. In one aspect, the current generator 16 may include appropriate circuitry for supplying electric current to the first and second electrodes 12, 14, as well as controlling the magnitude and timing of the electric current being supplied to the first and second electrodes 12, 14. For example, the current generator 16 may be a direct current system, an alternating current system or a stored energy current system. At this point, those skilled in the art will appreciate that the current generator 16 may be a commercially available resistance welding machine or a component taken from a commercially available resistance welding machine.

Figure 6:
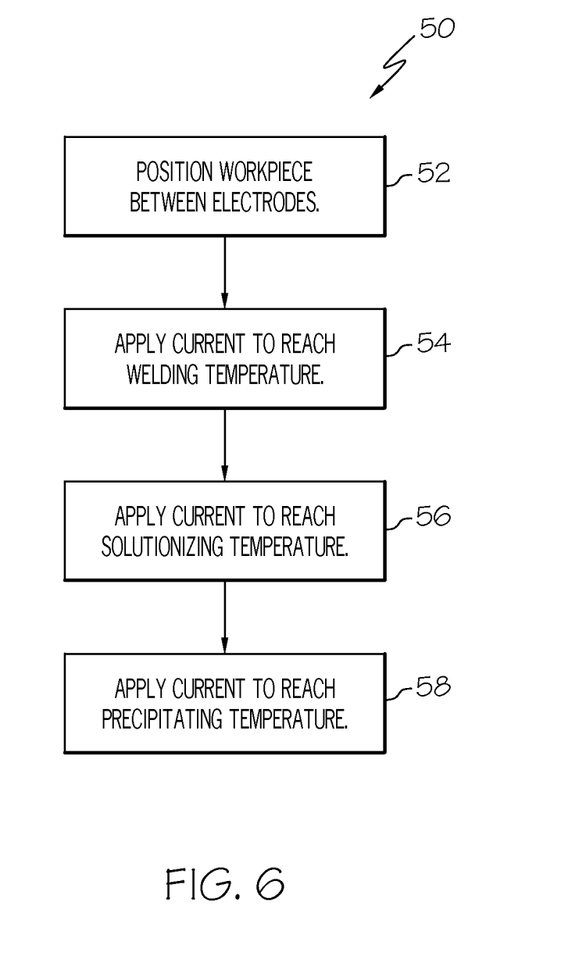
FIG. 6 is a flow chart illustrating, one aspect of the disclosed method for welding and heat treating metals and metal alloys.

Referring to FIG. 6, one aspect of the disclosed method for welding and heat treating metals and metal alloys, generally designated 50, may begin by positioning a workpiece 18 between two electrodes 12, 14 of a welding assembly 10, as shown in block 52. The electrodes 12, 14 may apply a clamping force to the workpiece 18. While the method 50 is described herein with reference to the disclosed welding assembly 10, those skilled in the art will appreciate that the disclosed method 50 may be performed using any appropriate welding assembly.

Referring to FIG. 3A, the workpiece 18 may include one or more members 40, 42 intended to be joined by welding. While two members 40, 42 are shown in FIG. 3A, those skilled in the art will appreciate that additional members may be included in the workpiece 18 without departing from the scope of the present disclosure.

The members 40, 42 of the workpiece 18 may be formed from any material capable of being joined by resistive heating. In one aspect, the members 40, 42 of the workpiece 18 may be formed from any metals or metal alloys capable of being joined by resistive heating. In another aspect, the members 40, 42 of the workpiece 18 may be formed from metals or metal alloys capable of being joined by resistive heating, and which require heat treatment to restore mechanical properties (e.g., strength). For example, the members 40, 42 of the workpiece may be formed from aluminium alloys. Exemplary aluminum alloys include 7075 aluminum and 2024 aluminum, pursuant to the International Alloy Designation System.

Still referring to FIG. 3A, in one particular aspect, the workpiece 18 may also include one or more auxiliary members 44. The auxiliary member 44 may have a size and thickness sufficient to provide the weld joint 32 (FIG. 3B) with a cross-sectional thickness $T_{WJ}$ that is substantially equal to or greater than the cross-sectional thickness $T_M$ of the welded members 40, 42, thereby potentially increasing the strength of the weld joint 32. While thickness $T_{WJ}$ is shown in FIG. 3B as being the thickness of the base 33 of the weld joint 32, the thickness $T_{WJ}$ may refer to the cross-sectional thickness of any portion of the weld joint 32 (e.g., the cross-sectional thickness of the transition region 38). Those skilled in the art will appreciate that the size and thickness of the auxiliary member 44 may be selected to achieve a desired thickness $T_{WJ}$ of the weld joint 32, thereby countering the loss of weld strength due to metal thinning in the weld area.

The auxiliary member 44 may be formed from a material having the same or similar chemistry as the members 40, 42, or from a material that is compatible with the material from which the members 40, 42 are formed. For example, when the members 40, 42 are formed from aluminum alloys, the auxiliary member 44 may be formed from an aluminum alloy or an appropriate aluminum alloy filler metal.

The auxiliary member 44 may optionally be secured (e.g., tack welded) to one or more of the members 40, 42 to ensure precise placement in the welding assembly 10. In one aspect, as shown in FIG. 3A, the auxiliary member 44 may be positioned between the members 40, 42. In another aspect, the auxiliary member 44 may be positioned between member 40 and the projection 22 of the first electrode 12. In yet another aspect, the auxiliary member 44 may be positioned between member 42 and the second electrode 14. In yet another aspect (not shown), a first auxiliary member may be positioned between members 40, 42 and a second auxiliary member may be positioned between one of the members 40, 42 and one of the first or second electrodes 12, 14.

Optionally, one or more members 40, 42, 44 of the workpiece 18 may have surfaces that are have been plated or coated with an appropriate material, such as zinc or silver, to enhance welding and promote bonding.

Returning to FIG. 6, once the workpiece 18 has been positioned between the first and second electrodes 12, 14, the method 50 may proceed to block 54. At block 54, the current generator 16 (FIG. 1) may be actuated to pass a welding current through the workpiece 18 for a sufficient amount of time to raise the temperature of the workpiece 18 to a welding temperature and form the displaced weld joint 32. Optionally, the welding current may be pulsed, which may be a more precise way of achieving and maintaining the welding temperature. Those skilled in the art will appreciate that the welding temperature will depend on the material being welded, any surface coatings, as well as the nature of the bond desired (e.g., weld nugget versus solid-state). For example, when the workpiece 18 is formed from an aluminum alloy, the welding temperature may be at least half of the solidus temperature of the aluminum alloy in degrees Kelvin. If multiple alloys are used having a range of solidus temperatures, the welding temperature may be at least half of the lowest solidus temperature in degrees Kelvin.

Figure 4A:
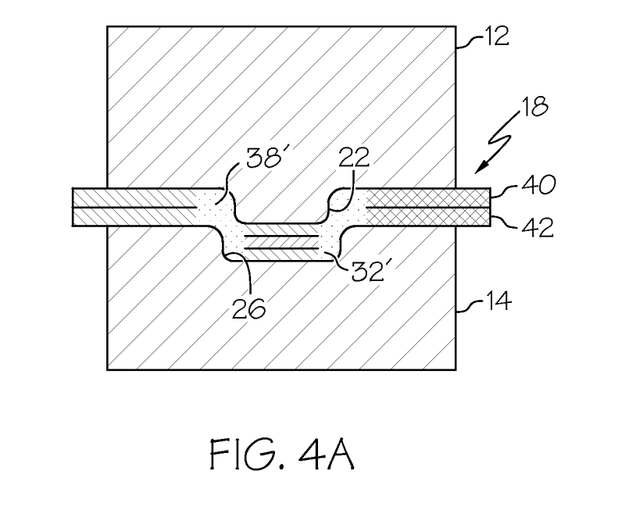
FIGS. 4A and 4B are cross-sectional views of a workpiece being welded and heat treated by the welding assembly of FIG. 1 in accordance with a second, alternative aspect of the present disclosure.
Figure 4B:
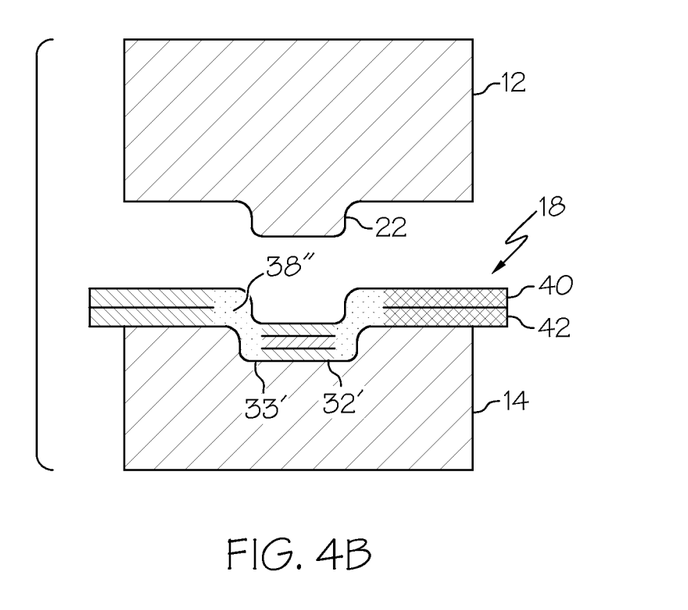

As shown in FIGS. 3B and 3C, the welding current may be maintained for a sufficient time to yield a weld nugget throughout the weld joint 32. Alternatively, as shown in FIGS. 4A and 4B, due to the specific current path resulting from use of the protrusion 22 and the recess 26, the welding current may be maintained for a sufficient time to yield a solid-state weld in the weld joint 32', but not necessarily throughout the entire weld joint 32'. For example, a weld nugget may be formed in the transition region 38' of the weld joint 32 and a solid-state weld may be formed at the base 33' of the weld joint 32'. Even though the members 40, 42 are only bonded by a weld nugget at the transition region 38' of the weld joint 32', the minimum thickness in the transition region 38' may be maintained above the thickness $T_M$ (FIG. 3B) of members 40, 42 by selecting an auxiliary member 44 (FIG. 3A) having the appropriate size and thickness.

Returning again to FIG. 6, once the welding operation is complete (block 54), the method 50 may proceed to block 56.

Optionally, a cooling step may occur between blocks 54 and 56. In one aspect, the welded workpiece 18 (FIG. 3B) may be cooled by circulating cooling fluid through the fluid channels 28, 30 (FIG. 1) in the first and second electrodes 12, 14 while one or more of the first and second electrodes 12, 14 are engaged with the welded workpiece 18. In another aspect, the welded workpiece 18 may be air cooled by removing the welded workpiece from engagement with one or both of the first and second electrodes 12, 14. Additional cooling steps may be introduced between the various steps of the method 50 or combined with the various steps of the method 50 without departing from the scope of the present disclosure.

At block 56, the current generator 16 (FIG. 1) may again be actuated to pass a first heat treating current through the workpiece 18, wherein the first heat treating current may be sufficient to raise the temperature of the workpiece 18, particularly, the weld joint 32, to a solutionizing temperature for a sufficient time to solutionize the material. Optionally, the first heat treating current may be pulsed, which may be a more precise way of achieving and maintaining the solutionizing temperature. The solutionizing temperature may be a temperature at which substantially all precipitates in the weld joint 32 dissolve into the base metal. Those skilled in the art will appreciate that the solutionizing temperature will depend on the material being heat treated. For example, when the workpiece 18 if formed from an aluminum alloy, the solutionizing temperature may the temperature commonly used for solutionizing heat treatment of the aluminum alloy.

Once the first heat treating process (block 56) is complete, the method 50 may proceed to block 58. At block 58, the current generator 16 (FIG. 1) may again be actuated to pass a second heat treating current through the workpiece 18, wherein the second heat treating current may be sufficient to raise the temperature of the workpiece 18, particularly, the weld joint 32, to a precipitation temperature for a sufficient time to obtain desired hardness of the material. Optionally, the second heat treating current may be pulsed, which may be a more precise way of achieving and maintaining the precipitation temperature. The precipitation temperature may be a temperature at which precipitation hardening of the weld joint occurs. Those skilled in the art will appreciate that the precipitation temperature will depend on the material being heat treated. For example, when the workpiece 18 if formed from an aluminum alloy, the precipitation temperature may the temperature commonly used for precipitation hardening of the aluminum alloy.

In one aspect, the first and/or second heat treating processes (blocks 56 and 58) may be performed by the assembly 10 using the same electrodes 12, 14 used for the welding process (block 54). In an alternative aspect, a second set of electrodes may be used for the first and/or second heat treating processes (blocks 56 and 58), wherein the electrodes are formed from a material that is less thermally conductive than the electrodes 12, 14 used during the welding operation (block 54).

In an alternative method for welding and heat treating metals and metal alloys, the various members 40, 42, 44 of the workpiece 18 may be assembled incrementally, thereby maintaining precise alignment. For example, the lower member 42 may be placed in the welding assembly 10 and processed (e.g., as in method 50) to form a depression similar in size and shape to the recess 26. Then, the auxiliary member 44 may be positioned over the processed lower member 42 and processed to urge the auxiliary member 44 into the depression in the lower member 42. Finally, the upper member 40 may be positioned over the processed lower and auxiliary members 42, 44 and processed to form the final weld joint 32. Other alternative methods may be used without departing from the scope of the present disclosure.

Figure 7A:
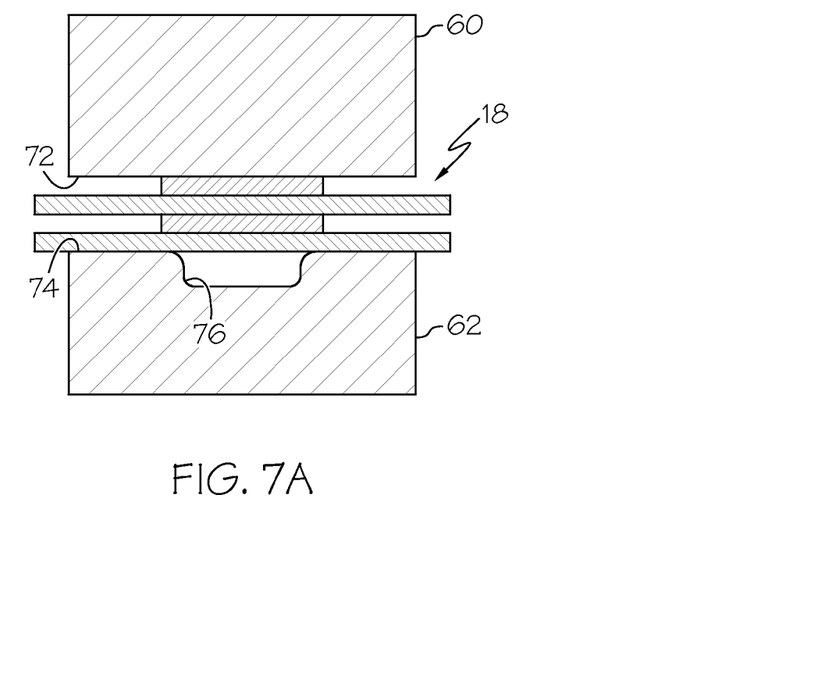
FIG. 7A is a cross-sectional view of an alternative aspect of the first and second electrodes of FIG. 1, shown clamping a workpiece.

In one alternative aspect of the disclosed welding assembly 10, the first and second electrodes 12, 14 may be replaced with the first and second electrodes 60, 62 shown in FIG. 7A. The first and second electrodes 60, 62 may be configured to produce the welded workpiece 64 shown in FIG. 7B, wherein the weld joint 66 is displaced on one side 68 and flat on the other side 70. Of course, those skilled in the art will appreciate that the weld joint 66 may be formed in various shapes and sizes without departing from the scope of the present disclosure.

The first and second electrodes 60, 62 may be formed from the same or similar materials from which the first and second electrodes 12, 14 (FIG. 1) are formed. Furthermore, the first and second electrodes 60, 62 may include cooling channels (not shown) similar to cooling channels 28, 30 shown in FIG. 1.

The first electrode 60 may be electrically coupled to the current generator 16 (FIG. 1) and may include a first engagement surface 72. The first engagement surface 72 may not include a protrusion. In one particular aspect, the first engagement surface 72 may be substantially flat or match the contour of the member 40. The second electrode 62 may be electrically coupled to the current generator 16 (FIG. 1) and may include a second engagement surface 74 having a recess 76 formed therein. The recess 76 in the second electrode 62 may be a recess similar in size and shape to the recess 26 in the second electrode 14 (FIG. 1). Of course, those skilled in the art will appreciate that the recess 76 may be formed to have various sizes and shapes, as is discussed above.

Figure 7B:
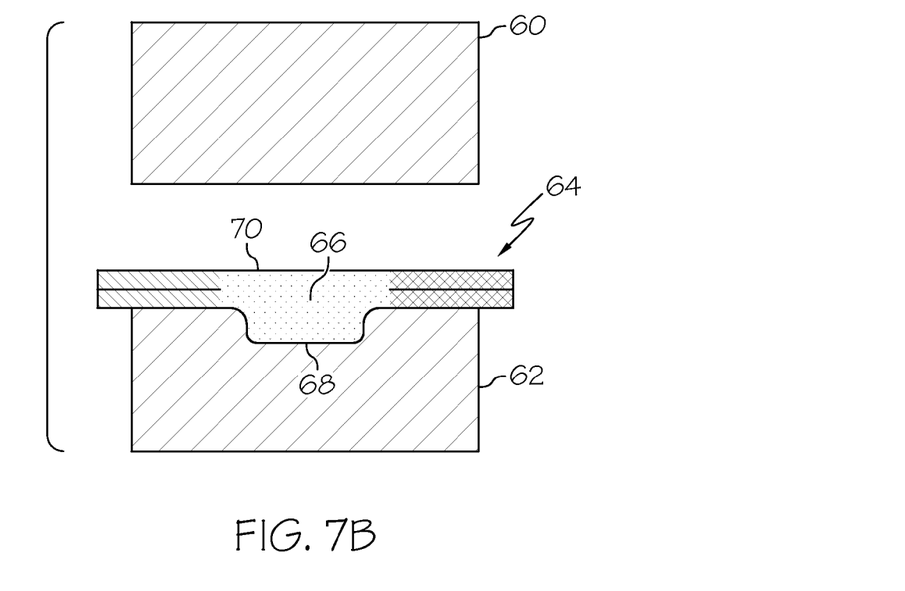
FIG. 7B is a cross-sectional view of the electrodes and workpiece of FIG. 7A, shown after a welding operation.

Thus, the resulting weld joint 66 may be shaped as shown in FIG. 7B, with one side 68 displaced due to the recess 76 and the other side 70 being flat or match the contour of the member 40. As such, the resulting weld joint 66 may have a cross-sectional thickness that is substantially equal to or greater than the cross-sectional thickness of the adjacent welded members.

Figure 8:
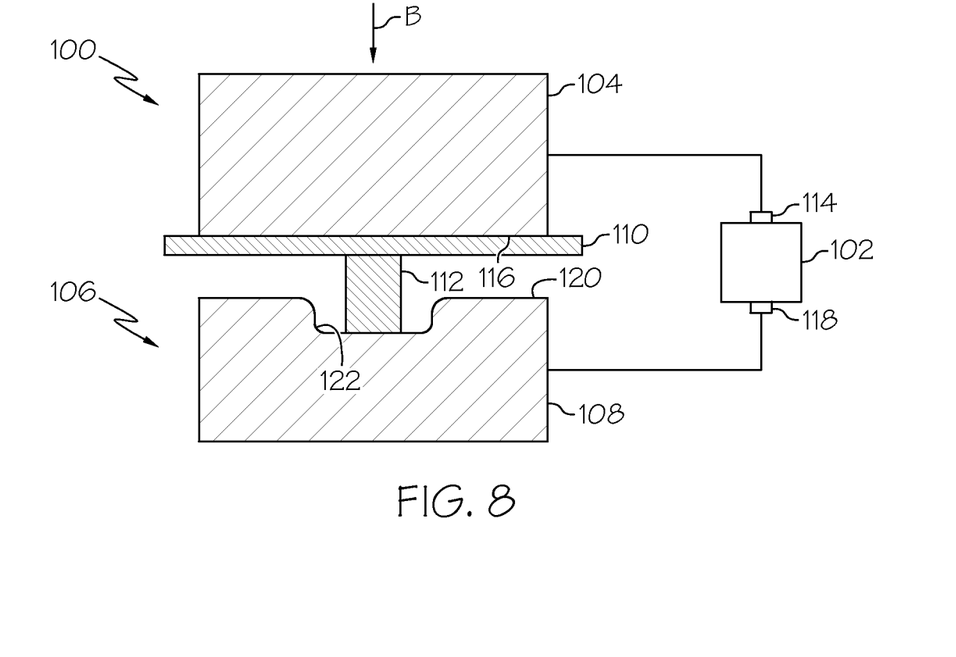
FIG. 8 is a schematic cross-sectional view of another aspect of the disclosed welding assembly.
Figure 9:
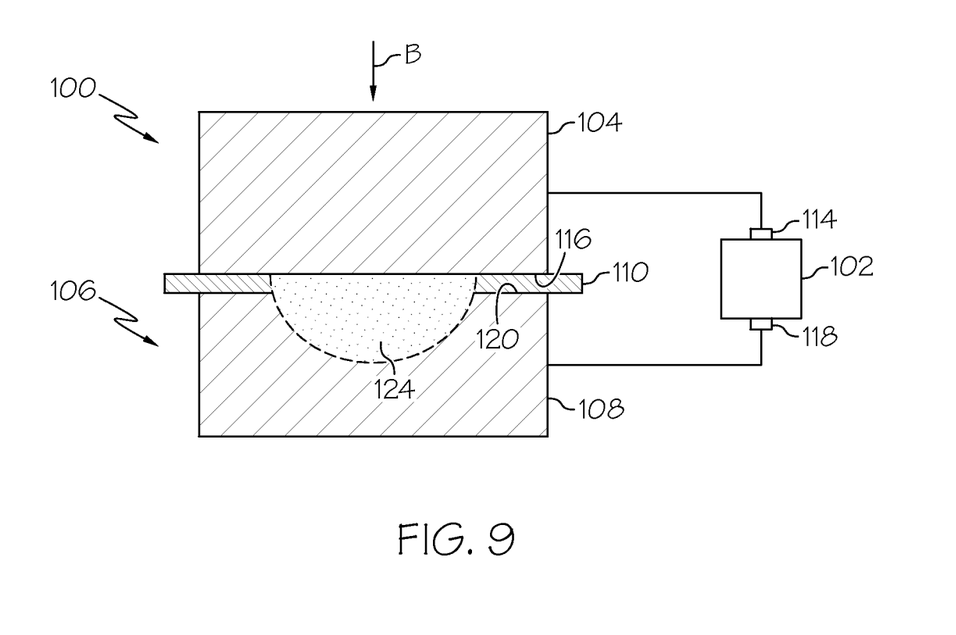
FIG. 9 is a cross-sectional view of the welding assembly of FIG. 8 after a welding operation.

Referring to FIGS. 8 and 9, another aspect of the disclosed welding assembly, generally designated 100, may include a current generator 102, an electrode 104 and a workpiece 106. The workpiece 106 may include one or more members 108, 110 and, optionally, one or more auxiliary members 112.

The electrode 104 may be electrically coupled to a first terminal 114 (either positive or negative) of the current generator 102 and may include a first engagement surface 116. Optionally, the electrode 104 may include a protrusion (not shown), similar to the protrusion described above.

At least one member 108 of the workpiece 106 may be electrically coupled to a second terminal 118 (opposite polarity of the first terminal 114) of the current generator 102 and may include a second engagement surface 120. As shown in FIG. 9, a recess 122 may be formed in the second engagement surface 120 of member 108. For example, the recess 122 may be machined in the second engagement surface 120 of member 108.

In one specific implementation, member 108 of the workpiece 106 may be the hull of a ship. The recess 122 may be formed in the hull of the ship for the purpose of welding member 110 to the hull.

As shown in FIG. 8, the workpiece 106 may be assembled with the auxiliary member 112 between members 108, 110. Other configurations may also be used without departing from the scope of the present disclosure. The workpiece 106 may be assembled to facilitate the desired current flow through the workpiece 106 during welding. For example, the auxiliary member 112 may space member 110 apart from member 108 prior to welding. The electrode 104 may be in electrical contact with member 110 and, optionally, may apply a mechanical force to the workpiece 106 in the direction shown by arrow B.

As shown in FIG. 9, the current generator 102 may be actuated to resistively heat the workpiece 106 and form a weld joint 124 between the members 108, 110. As the workpiece 106 is heated, the electrode 104 may urge member 110 and auxiliary member 112 toward member 108 to at least partially fill the recess 122 with the weld joint 124.

At this point, those skilled in the art will appreciate that the size of the auxiliary member 112 may be engineered to ensure a complete fill of the recess 122, but without overfilling such that member 110 closely approximates member 108 (i.e., the gap between members 108, 110 may be minimized or eliminated).

Figure 10:
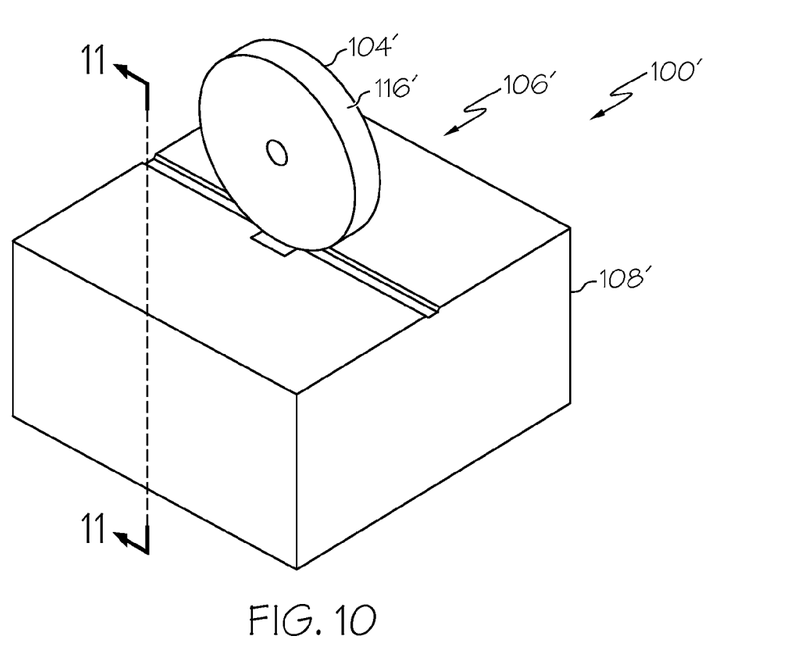
FIG. 10 is a schematic perspective view another aspect of the disclosed welding assembly.
Figure 11:
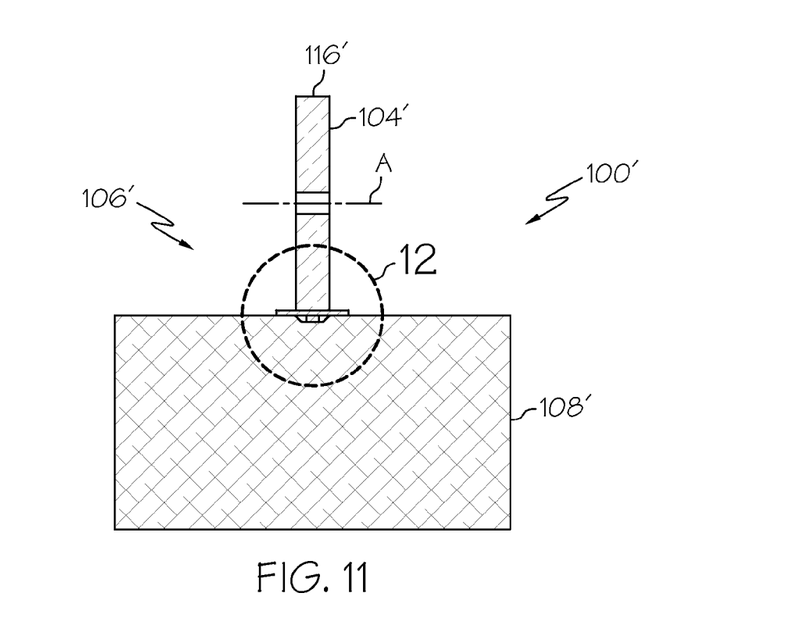
FIG. 11 is a cross-sectional view of the welding assembly of FIG. 10.
Figure 12:
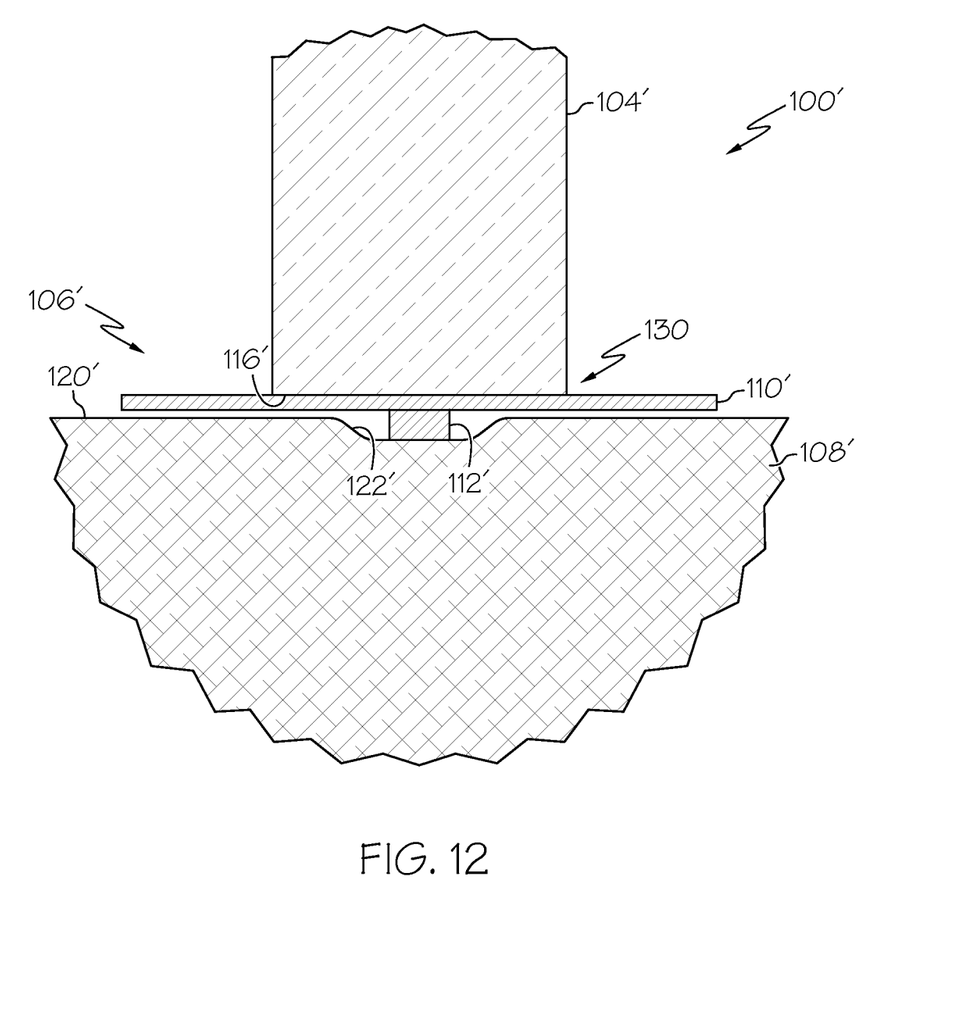
FIG. 12 is a close-up view of a portion of the welding assembly of FIG. 11.

Referring to FIGS. 10-12, one implementation of the welding assembly shown in FIGS. 8 and 9, generally designated 100', may include a current generator (not shown in FIGS. 10-12), a rotating electrode 104 and a workpiece 106'. The workpiece 106' may include one or more members 108', 110' and, optionally, one or more auxiliary members 112.

The rotating electrode 104' may rotate about an axis A of rotation relative to member 108', and may include a first engagement surface 116'. For example, the rotating electrode 104' may be a rotating cylindrical drum having an outer surface that defines the first engagement surface 116'.

Member 108' of the workpiece 106' may define a second engagement surface 120' having a recess 122' formed therein. Member 108' may be stationary or, alternatively, may also rotate about an axis of rotation.

The rotating electrode 104' may define a nip 130 between the first engagement surface 116' of the rotating electrode 104' and the second engagement surface 120'. At the nip 130, the workpiece 106' may be resistively heated as electric current passes therethrough, and the heated workpiece 106' may at least partially fill the recess 122', thereby forming a weld joint (not shown in FIGS. 10-12) that connects member 110' to member 108'.

Accordingly, at this point, those skilled in the art will appreciate that the disclosed welding assemblies and resulting welded workpieces, as well as the disclosed methods for welding and heat treating metals and metal alloys, may be used to form a weld joint that provides strength that is near, at or greater than the strength of the adjacent welded members. Furthermore, the chemistry and microstructure on the outer surfaces of the weld joint may closely resemble the chemistry and microstructure of the adjacent welded members, thereby resulting in improved corrosion resistance properties.

Figure 5:
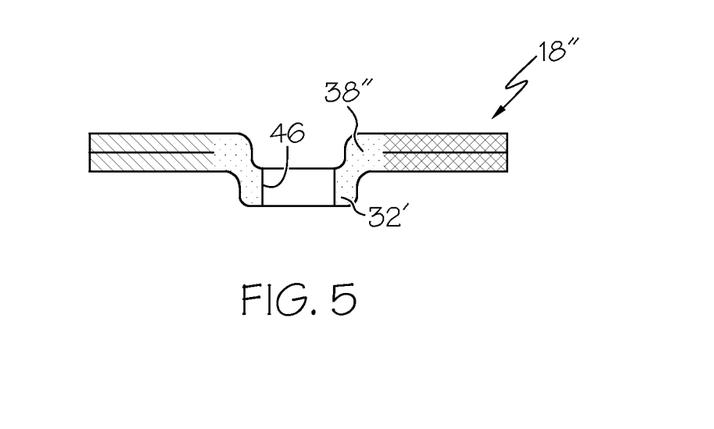
FIG. 5 is a cross-sectional view of the welded and heat treated workpiece of FIG. 3C further processed to include a crack arresting hole in accordance with another aspect of the present disclosure.

Finally, referring to FIG. 5, an optional hole 46 may be machined (e.g., drilled) into the weld joint 32" of the welded workpiece 18". The hole 46 may be round or elliptical, or may have various other generally smooth or continuous shapes. The hole 46 may be provided to arrest any fatigue cracks.

Those skilled in the art will appreciate that the location and size of the hole 46 may be selected such that the remaining portion (e.g., the transition region 38") of the weld joint 32" still has a thickness near, at or greater than the thickness of the adjacent workpiece 18", thereby avoiding (or at least minimizing) reduction in mechanical properties (e.g., strength) due to the hole 46.

Although various aspects of the disclosed welding assembly and associated method for welding and heat treating metals and metal alloys have been shown and described, modifications may occur to those skilled in the art upon reading the specification. The present application includes such modifications and is limited only by the scope of the claims.

What is claimed is:

1. A welding assembly comprising:
   a current generator comprising a first terminal and a second terminal, said second terminal having a polarity opposite of a polarity of said first terminal;
   an electrode electrically coupled to said first terminal, said electrode including a first engagement surface having a first surface area;
   a cooling fluid flowing through said electrode; and
   a workpiece comprising at least two workpiece members and an auxiliary member positioned between said workpiece members, said auxiliary member having a major surface having a second surface area that is less than said first surface area, wherein at least one of said workpiece members comprises a second engagement surface and a recess in said second engagement surface, and is electrically coupled to said second terminal.

2. The welding assembly of claim 1 wherein said workpiece members comprise aluminum or an aluminum alloy.

3. The welding assembly of claim 1 wherein said electrode includes a protrusion extending from said first engagement surface.

4. A method for forming a weld joint comprising the steps of:
   providing a current generator comprising a first terminal and a second terminal, said second terminal having a polarity opposite of a polarity of said first terminal;
   assembling a workpiece comprising a first member, a second member and an auxiliary member positioned between said first member and said second member, said first member being electrically coupled to said first terminal and comprising a first engagement surface and a recess in said first engagement surface;

positioning an electrode proximate said second member, said electrode being electrically coupled to said second terminal;

passing a welding current through said workpiece to form said weld joint, said weld joint having a weld joint width; and during said passing step, focusing said welding current into said weld joint width while cooling said workpiece outside of said weld joint width, wherein, after said passing step, a portion of said workpiece extends into said recess.

5. The method of claim 4 wherein said first and said second members comprise aluminum or an aluminum alloy.

6. The method of claim 4 wherein said electrode includes a protrusion extending therefrom.

7. The method of claim 4 wherein said first member is a hull of a ship.

8. A method for forming a weld joint comprising the steps of:

providing a current generator comprising a first terminal and a second terminal, said second terminal having a polarity opposite of a polarity of said first terminal;

assembling a workpiece comprising a first member, a second member and an auxiliary member, said first member being electrically coupled to said first terminal and comprising a first engagement surface and a recess in said first engagement surface, wherein said auxiliary member has a first volume and said recess has a second volume, and wherein said first volume is substantially equal to said second volume;

positioning an electrode proximate said second member, said electrode being electrically coupled to said second terminal;

passing a welding current through said workpiece to form said weld joint, said weld joint having a weld joint width; and during said passing step, focusing said welding current into said weld joint width while cooling said workpiece outside of said weld joint width.

* * * * *